Sept. 11, 1951 E. P. TURNER 2,567,831
ALTITUDE CONTROL SYSTEM FOR AUTOMATIC PILOTS
Filed April 30, 1947
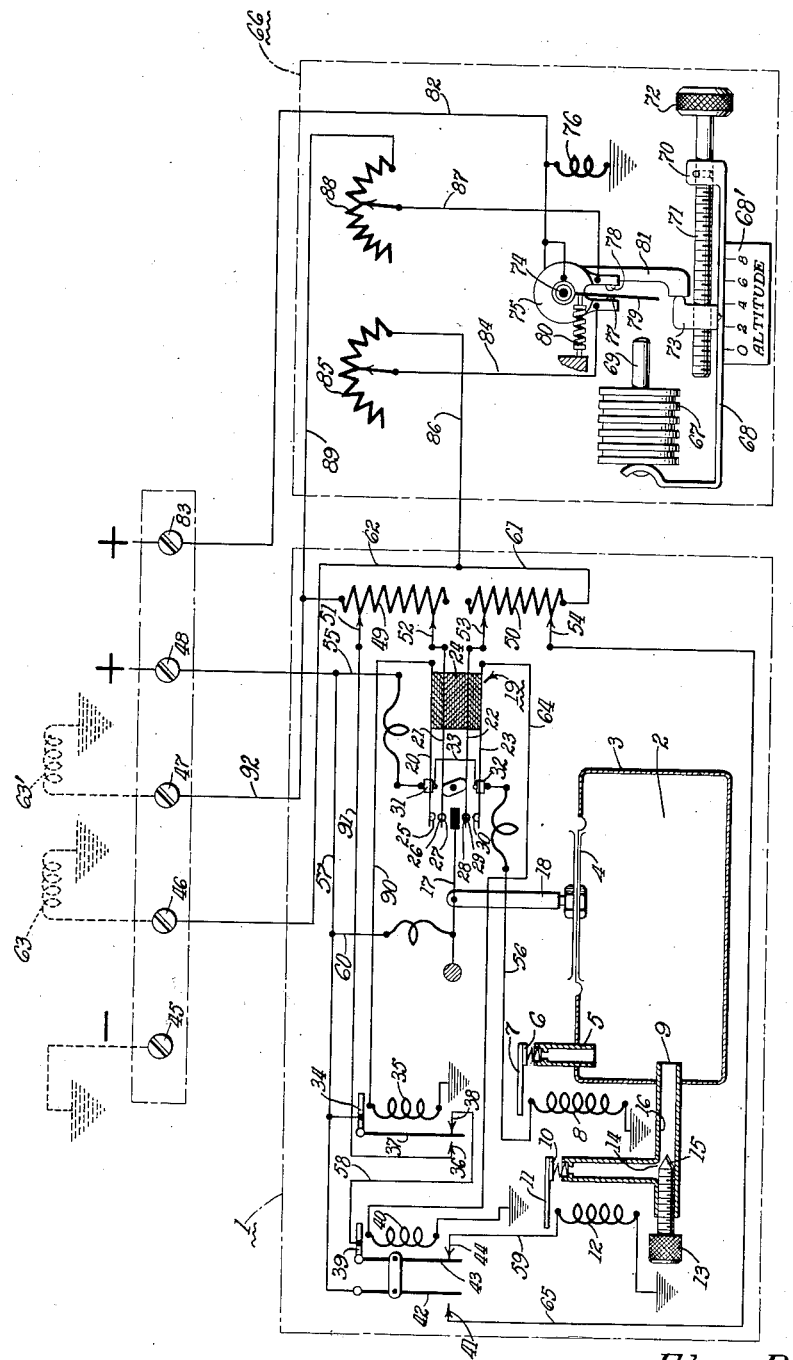
WITNESS
N. Leszczak
INVENTOR
Edgar P. Turner
BY
William P. Stewart
ATTORNEY Patented Sept. 11, 1951

2,567,831

UNITED STATES PATENT OFFICE 2,567,831

ALTITUDE CONTROL SYSTEM FOR AUTOMATIC PILOTS

Edgar P. Turner, Fanwood, N. J., assignor to The Singer Manufacturing Company, Elizabeth, N. J., a corporation of New Jersey Application April 30, 1947, Serial No. 744,997

11 Claims. (Cl. 74—5.4)

1

This invention relates broadly to control systems for aircraft in which the proper attitudes of flight are maintained automatically, and proper maneuvers are controlled locally or remotely through the agency of an automatic pilot.

More specifically, this invention relates to barometric control apparatus to be used in combination with automatic pilots for controlling the altitude level at which it is desired to fly aircraft and for controlling the rate at which it is desired to climb or dive said aircraft.

In the barometric devices heretofore used for this purpose, difficulties have been encountered due to inherent instability, resulting in hunting oscillations and loss of control.

It is a primary object of this invention, therefore, to provide an improved flight level control system which is substantially free from adverse hunting effects.

Another object of this invention is to provide a device which may be used with an automatic pilot to assist or temporarily relieve the human pilot in reaching and/or maintaining a desired altitude.

A further object of this invention is to provide a device which, in response to barometric pressure changes, sends a series of operating signals to the precessing system of an automatic gyropilot.

A still further object of this invention is to provide, in combination, two cooperative control units to obtain increased accuracy without sacrifice of stability.

With the above and other objects in view, as will hereinafter appear, the invention comprises the devices, combinations and arrangements of parts hereinafter set forth and illustrated in the accompanying schematic drawing of a preferred embodiment of the invention, from which the features thereof and the advantages attained thereby will be readily understood by those skilled in the art.

The accompanying drawing is a schematic wiring diagram of the system embodying the invention.

In the single figure, the two cooperative control devices are shown. A stabilizing unit 1 comprises an air chamber 2 formed by a container 3, preferably of thermal insulating material, and provided with a flexible membrane diaphragm 4, the movement of which is responsive to the difference in pressure between that in the chamber 2 and that of the outside atmosphere. A pipe 5 enters the chamber and selectively connects said chamber with the outside atmosphere through a valve 6 which is spring-biased to an open position, but which may be closed by operation of relay 7 through its coil 8.

A second pipe 9 enters the air chamber 2 and is selectively opened or closed to the outside atmosphere by means of a valve 10 which, although spring-biased to an open position, may be closed by operation of a relay 11 through its coil 12. The opening provided by the pipe 9 is controlled as to its air leak effectiveness by adjustment of a knob 13 which controls the size of a restriction 14 formed by a needle valve 15 and a pipe wall 16. It is obvious that the smaller the size of the restriction, the longer will be the time required for pressures within and without the chamber 2 to become equal due to the leakage of the air past said restriction, in a manner well known to the art.

The diaphragm 4 is connected to a pivoted contact arm 17 by means of a link element 18 so that normal pressure-responsive movements of the diaphragm are translated into angular displacements of the arm 17. A stationary contact assembly 19 cooperates with said arm 17 to provide a sequence of electrical current signals, as will be described presently. The assembly 19 comprises four spaced-apart leaf contact springs 20, 21, 22 and 23, each secured at one end in a stationary insulation block 24. When there is no difference in the pressure on the opposite faces of the diaphragm 4, the contact arm 17 is in its neutral position midway between the inner contact springs 21 and 22. Contact points 25, 26, 27, 28, 29 and 30 are separated, in this central position of the arm 17. Contacts 31 and 32 are secured mechanically to the springs 20 and 23, but are insulated electrically therefrom. In the neutral position of the diaphragm 4, the contact 31 is electrically connected to the contact 32, as shown, by way of the stationary bridge connector 33, and this completes the stationary contact assembly.

Two relays are employed to provide automatic switching, viz., a single-pole, double-throw relay 34, having coil 35 and contact elements 36, 37, 38 and a double-pole, double-throw relay 39, having coil 40 and contact elements 41, 42, 43 and 44. It is understood that the relay contacts are shown in the unexcited condition of the relay coils. Terminals 45, 46, 47 and 48 provide means for connecting the stabilizer unit 1 to a battery source and into the gyroscope-precessing system of an automatic pilot of the type shown and described in my copending U. S. patent application, Serial No. 636,238, filed December 20, 1945, to which reference may be had for a more complete explanation thereof. It is sufficient here to note that the terminal 45 connects to the negative or grounded side of the D.-C. supply, the terminal 48 connects to the positive side of the D.-C. supply and the terminals 46 and 47 are for connection to proper precessing coils 63 and 63' to give an "up" and a "down" signal, respectively, to the aircraft elevator servo-motor. It is understood that the intensity of the signals is proportional to the strength of the currents and resistors 49 and 50 employed to limit and adjust the precessing-coil currents by means of taps 51, 52, 53 and 54 thereon, as will presently be apparent.

Except for the specific electrical connections, the above describes a schematic embodiment of a part of this invention which will now be used for explaining the operation thereof, the necessary electrical connections being pointed out as the explanation proceeds.

Let us first consider the operation of the stabilizer unit 1 as an assist pilot. In this case, when the human pilot wishes to maintain automatically the altitude at which he is flying, he turns on the unit at that altitude. This is accomplished by applying positive and negative battery voltage to the terminals 48 and 45 respectively. This causes current to flow from the terminal 48 through a conductor 55 to the contact 31, thence through the bridge 33 to the contact 32, a conductor 56, and the coil 8 to ground, thus completing the circuit. The relay 7 picks up and closes the valve 6. A second circuit is traced from the terminal 48 through a conductor 57 to the contact 37, the contact 38, the conductor 58, the contact 43, the contact 44, a conductor 59, through the coil 12 to ground. Thus, the relay 11 also picks up and closes the valve 10. With valves 6 and 10 closed, the chamber 2 is completely sealed from the atmosphere.

It will be observed that, at the time when the stabilizer unit 1 was turned on, pressures equal to the atmospheric pressure at the altitude desired existed on both sides of the diaphragm 4 and it was, therefore, balanced in its neutral position with the contact arm 17 midway between the contacts 27 and 28. The aircraft continues in its original attitude which, let us assume, for example, is a dive, and the pressure differential on the diaphragm 4 causes the contact arm 17 to lower and, after sufficient altitude change, to make contact with the contact 28. When this occurs, a curren circuit is set up from the terminal 48 through the conductor 57, a conductor 60, the contact arm 17, the contact 28, the spring 22, and the tap 53, thence through a large portion of the resistor 50 and conductors 61 and 62 to the terminal 46 and through the precessing coil 63 (on the automatic pilot) to ground. This causes slow precession of the gyro unit, as explained in my copending application referred to above, and the elevator control surface is operated so as to urge the craft into a climb. The craft then begins to level off but may still lose altitude causing further travel of the contact arm 17 until the contacts 29 and 30 close. When this occurs, a circuit is established from the terminal 48 through the conductors 57 and 60, the contact arm 17, the contacts 28, 29 and 30, the spring contact 23, a conductor 64, and the coil 40 to ground. The relay 39 picks up and separates the contacts 43 and 44, thereby interrupting the current to the coil 12, and dropping out the relay 11. This opens the valve 10, whereupon air begins to leak from the atmosphere into the chamber 2 past the restriction 14, thus tending to equalize the pressures acting on opposite sides of the diaphragm 4. At the same time, the relay contacts 41 and 42 are made and a circuit is established from the terminal 48, through the conductor 57, contacts 42 and 41, thence by way of a conductor 65 to the tap 54 and through a small portion of the resistor 50, through the conductors 61 and 62 to the terminal 46, thence through the precessing coil 63 to ground. This latter circuit provides increased strength for the current to the precessing coil and causes an increased precession rate with consequently greater corrective movement of the aircraft elevator. This condition of inceased current strength or fast climb signal can persist only so long as the rate of change of atmospheric pressure is greater than a value determined by the air leak rate manually set by the knob 13. When the aircraft has reduced its dive rate to this predetermined value, the pressures on diaphragm 4 are such that contacts 29 and 30 just open. This again closes valve 10, and the above-described process will be repeated intermittently until the aircraft is in sufficiently level flight so that the pressure change is insufficient to reclose contacts 29 and 30 any more. The opening of the adjustable leak constitutes a recalibration of the stabilizer instrument in the sense that a new reference altitude is continually being established while the leak is open, and the new reference altitude is always closer to the actual present altitude of the aircraft than was the original reference altitude.

The aircraft normally should level off soon after the fast climb signal is sent to the pilot, and reverse movement of the diaphragm should begin, thus turning off the air leak and resuming the slow precession rate. However, in the event that the aircraft does not rapidly level off after the fast climb signal is initiated, further decrease in altitude causes sufficient movement of the contact arm 17 to break the contact between the contact 32 and the bridge element 33, whereby current to the relay coil 8 is interrupted. The relay 7 drops out and opens the valve 6 connecting the chamber 2 directly with the atmosphere. This tends to equalize the diaphragm pressures very rapidly and establishes a new reference altitude at the existing value, and thus relieves the craft of the necessity of climbing appreciably before coming to level flight.

With the above arrangement, a small signal produces a low rate of precession and is accompanied by low hunting. Valve 10 remains closed and there is minimum drift from the reference altitude. A large signal produces a high rate of precession but, with the air bleed through valve 10, is accompanied by desirably low hunting.

It is to be noted that the provision for bleeding air to or from the air chamber and for directly venting said chamber decreases the accuracy of response of this system but, at the same time, improves the stability thereof because it provides an anticipatory action which prevents over-response of the system and results in reduced hunting.

It is clear that the knob 13 may be adjusted to establish an optimum value of bleeding rate for given conditions and minimum hunting.

Obviously, the above described instrument may be made operative or inoperative from a distance by radiant energy control means, when so desired through control of the power supply thereto. The stabilizing unit 1, described above, may be operated as a single instrument in connection with an automatic pilot to effect automatic altitude control for aircraft.

A second control device 66, called a sensing unit, may be used in cooperation with the stabilizing unit 1 set forth above and, in combination therewith, provides a more positive sense reference and enables any altitude and a maximum rate of climb to be preset in the system. The sensing device comprises a closed Sylphon bellows 67, evacuated and spring loaded so that increased altitude causes expansion thereof. The Sylphon bellows 67 is anchored at one end to a supporting frame 68 and carries at the free end thereof a ram 69. The stationary frame 68 is formed with a boss 70 which provides a bearing for a lead screw 71, operated by turning a knob 72. A traveling nut 73, threaded onto the lead screw 71, may be positioned at any point along the support 68 by manipulation of the knob 72.

Located on an axis 74, fixed with respect to the frame 68, is a magnetic plate 75, free normally to turn about said axis but which may be locked in any angular position by exciting an attracting solenoid, indicated schematically as 76. Secured to, but insulated from, the plate 75 are spaced contacts 77 and 78. Also pivoted on axis 74 is a spring contact 79, positioned intermediate said spaced contacts 77 and 78, and biased in position, as shown by a tension spring 80.

An arm 81, secured to the plate 75, is extended to contact the traveling nut 73 against which it is urged due to the bias force of the spring 80, acting through the contact 79 and the plate 75. The spring contact 79 and one end of the solenoid 76 are connected by a conductor 82 to a terminal 83 to which the positive battery voltage is applied when it is desired to "cut in" the sensing unit.

The contact 77 is connected by a conductor 84 to a rheostat 85 and thence, by a conductor 86, to the terminal 46. Similarly, the contact 78 is connected by a conductor 87 to a rheostat 88 and thence, by a conductor 89 to the terminal 47.

It will be seen that longitudinal movement of the ram 69 in response to pressure change, due to increasing altitude for example, ultimately causes movement of the spring contact 79 and, if the plate 75 and the contacts 77 and 78 are held stationary by the solenoid 76, the contact 79 will move out of contact with the contact 77 and into contact with the contact 78.

It is clear that, since motion of the ram 69 is dependent upon altitude change, an altitude scale 68' may be marked out along the support 68, as shown, so that the plate 75 with the contacts 77 and 78 may be preset, by manipulation of the knob 72, to cause switching at a predetermined altitude.

The rheostats 85 and 88 are used for controlling the magnitudes of the current supplied to the precessing coils by the sensing unit 66, as will be explained presently.

Let us assume that the human pilot desires to have the aircraft climb automatically to a predetermined altitude and level off there. To do this, he will turn on both stabilizing and sensing instruments with the latter preset for the desired altitude as provided. Since the contacts 77 and 79 are closed, current will traverse the circuit from the terminal 83 through the conductor 82 to the contacts 79 and 77, the conductor 84, through the rheostat 85 and the conductor 86 to the terminal 46, and through the coil 63 to ground. This produces precession to cause the aircraft to climb. Since the sensing unit responds only to a final altitude, the circuit just described will remain closed until the preset altitude is reached. If, however, this were the only control effective, it is clear that continued precession would occur, in which case, the aircraft would loop vertically or go into a stall, neither of which is desirable.

To prevent this, the stabilizing unit provides a counter precession to balance that created by the sensing unit. For example, as the aircraft climbs, responsively to the signal from the sensing unit, the diaphragm 4 of the stabilizer unit moves outwardly responsive to decreasing pressure and the contact arm 17 makes contact with the contact 27. This establishes a current feed of small magnitude through the precession coil 63'. While this counter precession is not normally great enough to overcome that produced by the coil 63, it does immediately decrease the net precession causing climb. Further increase in altitude causes further movement of the diaphragm 4 and the contact arm 17 until the contact 26 closes with the contact 25. This establishes a circuit from the terminal 48, through the conductors 57 and 60, the arm 17, the contacts 27, 26 and 25, the contact spring 20, thence by a conductor 90 through the coil 35 to ground. The relay 34 picks up and separates the contacts 37 and 38 which, as explained hereinbefore, opens the bleed valve 10 to start pressure equalization on opposite sides of the diaphragm 4. At the same time, the contacts 36 and 37 close to establish a circuit from the terminal 48, through the conductor 57, the contact arm 37, the contact 36 and a conductor 91 to the tap 51, thence through a small portion of the resistor 49 and a conductor 92 to the terminal 47 and through the precession coil 63' to ground. The tap 51 is normally so adjusted that the current to the coil 63' is greater than that to the coil 63 from the sensing unit signal. That is to say, the counter precession is now sufficient to overpower the precession causing climb resulting in a lesser rate of climb of the aircraft. This will persist until the pressure difference on opposite sides of the diaphragm 4 is lowered due to the air bleed to cause the contact arm 17 to open the contacts 25 and 26, whereupon the climb signal from the sensing unit will again predominate and the rate of climb again increases, and the foregoing sequence of events will repeat itself. This automatic intermittent operation continues until the preset altitude is reached, whereupon the ram 69 contacts the arm 79 and breaks contact with the contact 77, thus destroying the constant climb signal from the sensing unit. It will be observed from the above description that the combination of the constant signal from the sensing unit with the periodic counter signal from the stabilizing unit, applied as a function of the air bleed rate, limits and controls the rate of climb or dive and, by proper adjustments of bleed rate by manipulation of knob 13 and of the precession coil current values by taps 51, 52, 53 and 54, and rheostats 85 and 88, these maximum rates may be set as desired.

The bleed rate feature, as applied to this invention, actually performs a double function, When the stabilizing unit is used alone, the bleed rate provides anticipatory action and prevents overtravel and reduces hunting. When the sensing unit is added to the system, the bleed rate also functions to limit the maximum rate of climb or dive to prevent stall and loss of control.

As explained above, the stabilizing unit may automatically recalibrate itself to an altitude different from that desired; and this is done to prevent hunting, but, at the same time, decreases the accuracy of response. The sensing unit helps to regain this accuracy by acting as an altitude monitor. If, due to excessive operation of the bleed valve, the stabilizing unit urges levelling off at an altitude sufficiently different from that desired, the sensing unit will not be satisfied but will continue to signal the automatic pilot for a climb or a dive until the desired altitude is attained.

In cases of remote control, where the preset feature is not desired, the pilot may turn on the sensing unit by radio means at any altitude it is required to maintain. This act of turning on the unit causes the solenoid 76 to lock the plate 75 in position to monitor the altitude of the aircraft to the value existing at that time. Further, the traveling nut 73 may be set to some minimum altitude value, as desired, under certain circumstances.

It is desirable that the manual control of the auto-pilot by means of the regular control stick, as described in my copending application referred to above, shall have priority over the control by the present stabilizing and sensing units and this may be readily provided by properly adjusting the relative strengths of the currents to the precessing coils.

Having thus set forth the nature of the invention, what I claim herein is:

1. In an altitude control system for aircraft having a gyroscope and gyroscope-precessing means for maneuvering said gyroscope, means responsive to the atmospheric pressure for urging continuous actuation of said precessing means until a predetermined altitude is reached, and means for intermittently modifying the actuation provided by said first means in response to the rate of change of said atmospheric pressure.

2. In a flight level control system for aircraft having a gyroscope controller and means for precessing said gyroscope controller for maneuvering said aircraft, a first means rendered effective upon a change of atmospheric pressure for continuously actuating said precessing means and second means rendered effective at intervals and for a length of time in each interval dependent on the rate of change of atmospheric pressure for modifying the actuation of said precessing means by said first means.

3. In a control system for aircraft having a gyroscope and separate means responsive to electric current for causing opposite precession of said gyroscope for maneuvering said aircraft, first means responsive to the departure of the atmospheric pressure from a predetermined value for initiating a first current in one of said precession-causing means, second means responsive to the resulting corrective change of atmospheric pressure for intermittently initiating a second current in the other of said precession-causing means, and third means for causing said second current to persist each time it is initiated only so long as the rate of change of said atmospheric pressure exceeds a predetermined value.

4. In a control system for aircraft having a control gyroscope and means for precessing said gyroscope for maneuvering said aircraft, means rendered effective upon small changes in atmospheric pressure for actuating said precessing means at a low rate, means responsive to larger changes in atmospheric pressure for intermittently actuating said precessing means at a higher rate and means for maintaining said high rate at each actuation responsively to the rate of change of said atmospheric pressure.

5. In a control system for aircraft having gyroscope-precessing means, means renderd effective upon small changes in atmospheric pressure for actuating said precessing means at a low rate, means responsive to larger changes in atmospheric pressure for actuating said precessing means at a higher rate and means for maintaining said higher rate at each actuation as long as the rate of change of atmospheric pressure exceeds a predetermined amount.

6. In a control system for aircraft, and air chamber, a movable diaphragm separating the interior of said chamber from the atmosphere, a first, normally-open duct connecting said chamber with said atmosphere, a second, normally-open duct connecting said chamber with said atmosphere, means for closing said ducts, means responsive to small movements of said diaphragm for opening said first duct, means responsive to larger movements of said diaphragm for opening said second duct, and means for adjusting the rate of air leak through said first duct.

7. In an automatic control system for aircraft having gyroscope-precessing means for maneuvering said gyroscope to control said aircraft, sensing means effective, responsive to a departure of the atmospheric pressure from a predetermined value, to actuate said precessing means, stabilizing means, including first means effective, responsive to a change in atmospheric pressure of a predetermined small amount, to modify said actuation of the precessing means, and second means effective, responsive to a change in atmospheric pressure of a predetermined larger amount, to further modify said actuation of the precessing means, said second means being intermittently effective to limit the time rate of change of altitude of the aircraft to a predetermined amount.

8. In an automatic control system for aircraft having first and second current-responsive gyroscope-precessing means for controlling said aircraft, sensing means rendered effective, responsively to a departure of the atmospheric pressure from a predetermined value for establishing a corrective electric current in said first gyroscope-precessing means, stabilizing means, including first means effective, responsively to a change in atmospheric pressure of a predetermined small amount, to establish in said second gyroscope-precessing means an electric current smaller than that established in said first gyroscope-precessing means, and second means effective, responsively to a change in the atmospheric pressure of a predetermined larger amount, to establish in said second gyroscope-precessing means an electric current larger than that established in said first gyroscope-precessing means, said second means being intermittently effective to limit the rate of change of altitude of the aircraft to a predetermined value.

9. In an automatic control system for aircraft having a gyroscope-precessing means for maneuvering said aircraft, sensing means effective, responsively to a departure of the atmospheric pressure from a predetermined value, to send a first signal to said precessing means, a stabilizing means effective, responsively to a change of the atmospheric pressure, to send a second signal to said precessing means having an effect on the precession opposite to that of said first signal, means for increasing the strength of said second signal responsively to a predetermined change of the atmospheric pressure and means responsive to the time rate of change of said atmospheric pressure for intermittently re-establishing said signal of increased strength.

10. In an automatic control system for aircraft having gyroscope-precessing coils for controlling said aircraft responsively to electrical currents in said coils, means responsive to changes in atmospheric pressure for applying current to a selected one of said precessing coils, means responsive to the direction of said changes in atmospheric pressure for selecting the proper coil for the current application, means responsive to larger changes in atmospheric pressure for producing increased currents in said gyroscope-precessing coils, means for intermittently maintaining said increased currents to limit the rate of change of altitude of the aircraft to a predetermined value and manual means for setting said predetermined value.

11. In an automatic altitude control system for aircraft having a control gyroscope and means for precessing said gyroscope, pressure-responsive means for causing said precessing means to urge continuous precession of said gyroscope until a predetermined altitude is reached, means responsive to a change of pressure to urge a decrease of the rate of said precession, and means, responsive to a larger change of pressure, for intermittently urging a reversal of said precession, said last urging means serving to limit the time rate of change of altitude of the aircraft to a predetermined maximum value.

EDGAR P. TURNER.

REFERENCES CITED

The following references are of record in the file of this patent:

UNITED STATES PATENTS

| Number | Name | Date |
| --- | --- | --- |
| 2,152,144 | Minelli | Mar. 28, 1939 |
| 2,167,077 | Koster | July 25, 1939 |
| 2,191,250 | Fischel | Feb. 20, 1940 |
| 2,315,501 | Crane et al. | Apr. 6, 1943 |
| 2,443,748 | Sanders, Jr., et al. | June 22, 1948 |
| 2,459,495 | Brown | Jan. 18, 1949 |